United States Patent
Hegde

(10) Patent No.: US 11,102,136 B2
(45) Date of Patent: Aug. 24, 2021

(54) AUTOMATED CACHE BUCKETS USING MIRRORS FOR CONTENT DISTRIBUTION NETWORKS (CDN)

(71) Applicant: International Business Machines Corporation, Armonk, NY (US)

(72) Inventor: Harsha Hegde, Buffalo Grove, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 16/511,230

(22) Filed: Jul. 15, 2019

(65) Prior Publication Data

US 2021/0021535 A1 Jan. 21, 2021

(51) Int. Cl.
| | | |
|---|---|---|
| *H04L 12/841* | (2013.01) | |
| *H04L 29/08* | (2006.01) | |
| *H04L 12/733* | (2013.01) | |
| *H04L 12/725* | (2013.01) | |
| *H04L 29/06* | (2006.01) | |

(52) U.S. Cl.
CPC .......... *H04L 47/286* (2013.01); *H04L 45/20* (2013.01); *H04L 45/302* (2013.01); *H04L 67/1097* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,809,892 B1* | 10/2010 | Chatterjee | G06F 11/2097 711/143 |
| 8,423,672 B2 | 4/2013 | Liu et al. | |
| 8,762,642 B2 | 6/2014 | Bates et al. | |
| 9,369,520 B2 | 6/2016 | Luecke et al. | |
| 9,460,105 B2 | 10/2016 | Carmichael | |
| 9,489,395 B2* | 11/2016 | Goetz | G06F 3/0644 |
| 9,641,482 B2 | 5/2017 | Leighton et al. | |
| 10,079,887 B2 | 9/2018 | Motwani et al. | |
| 2011/0289122 A1* | 11/2011 | Grube | H04L 67/1097 707/812 |
| 2014/0325577 A1 | 10/2014 | Garcia Mendoza et al. | |
| 2015/0288647 A1* | 10/2015 | Chhabra | H04L 67/1023 709/245 |
| 2016/0077926 A1* | 3/2016 | Mutalik | G06F 11/1453 711/162 |
| 2016/0171029 A1* | 6/2016 | Sanvido | G06F 3/0641 707/745 |

* cited by examiner

*Primary Examiner* — Saba Tsegaye
(74) *Attorney, Agent, or Firm* — Anthony England; Andrew D. Wright; Roberts Calderon Safran & Cole, P.C.

(57) ABSTRACT

A method for execution by one or more processing modules of one or more computing devices of a dispersed storage network (DSN), the method begins by receiving a dispersed storage network (DSN) access request and determining an endpoint address from which the DSN access request is originating. The method continues by determining a first geographic location based on the endpoint address. The method continues by determining a target bucket and object the DSN access request is associated with and determining a second geographic location of the target bucket. For differing first and second geographic locations, the method continues by creating a mirror bucket in the first geographic location and configuring an access layer to route future DSN access requests to the mirror bucket based on TTL needs.

20 Claims, 7 Drawing Sheets

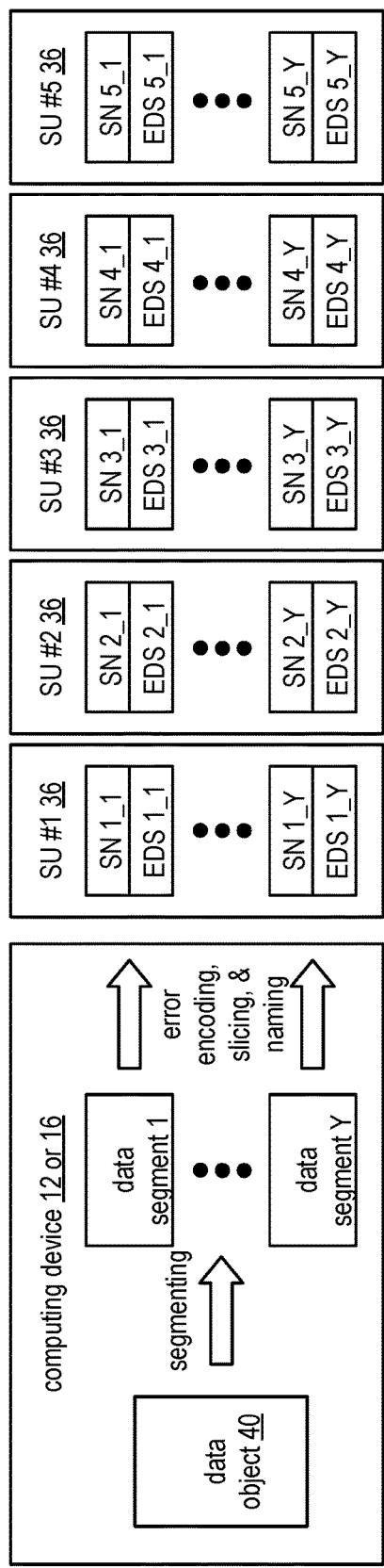
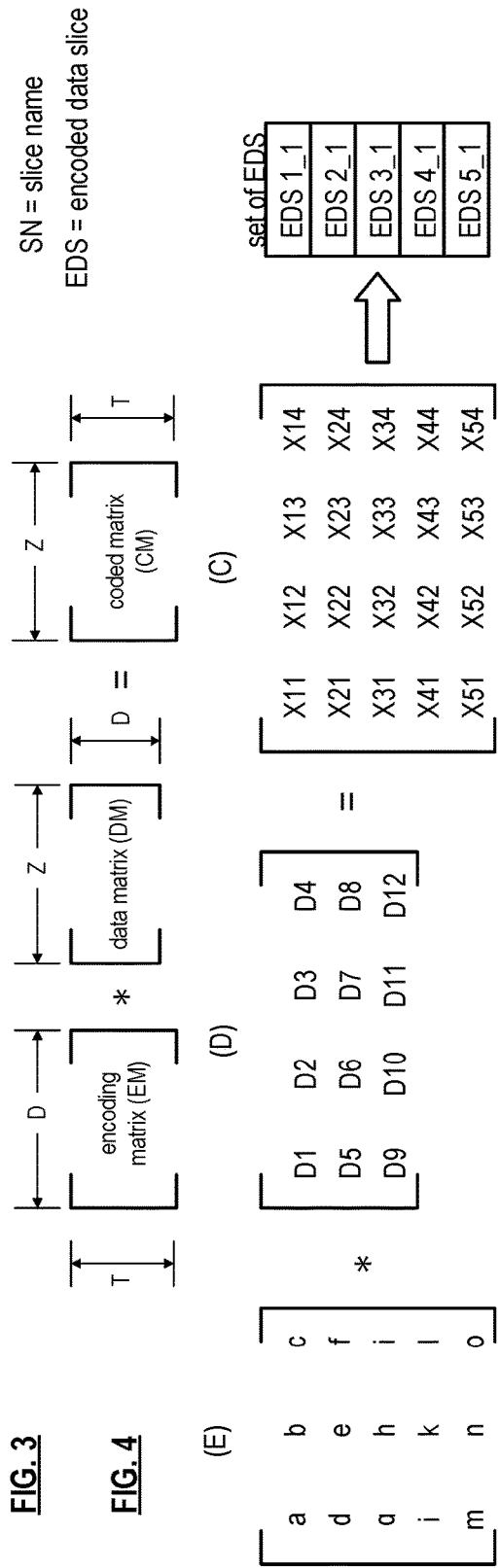

AUTOMATED CACHE BUCKETS USING MIRRORS FOR CONTENT DISTRIBUTION NETWORKS (CDN)

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), workstations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
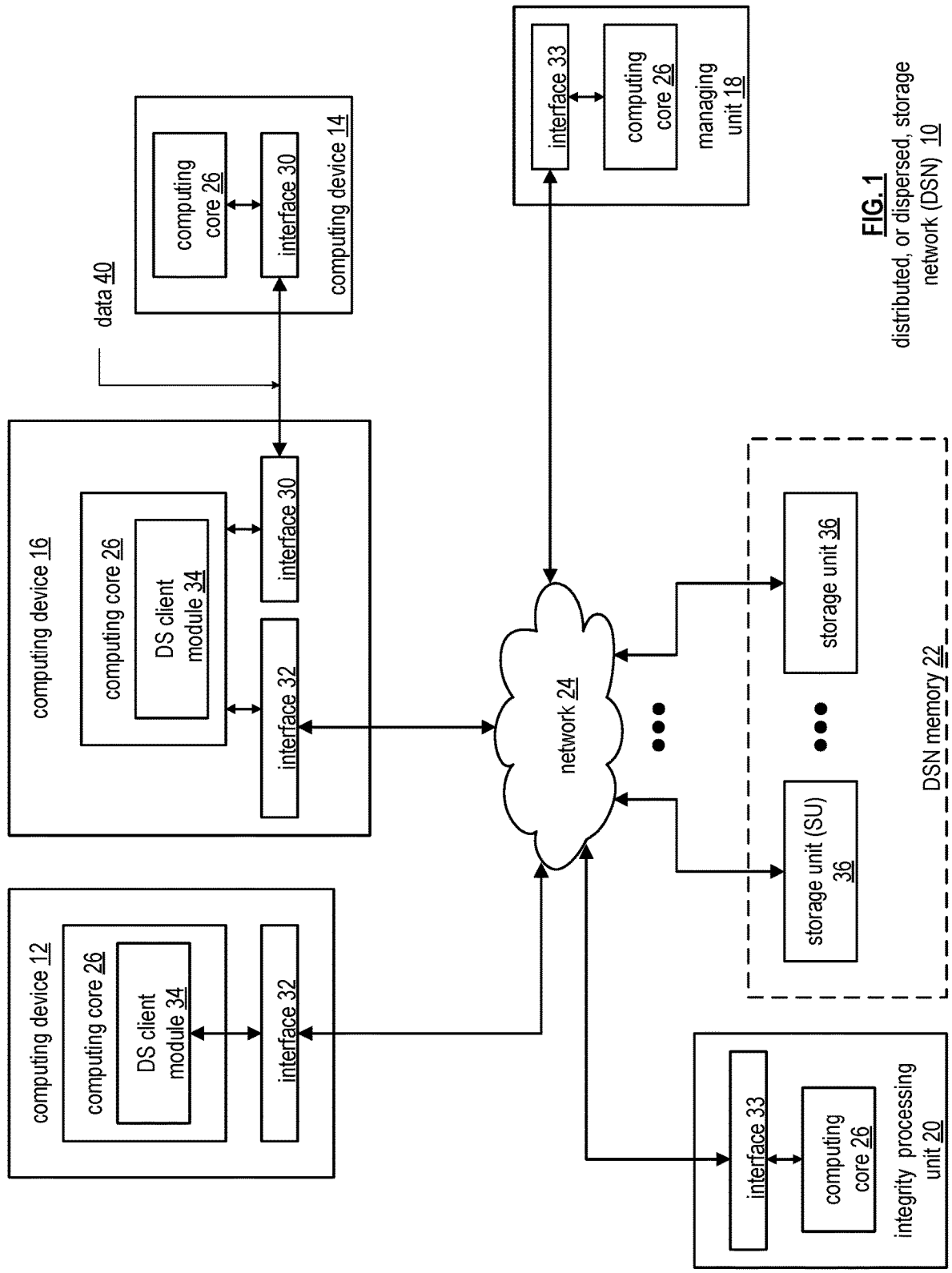
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
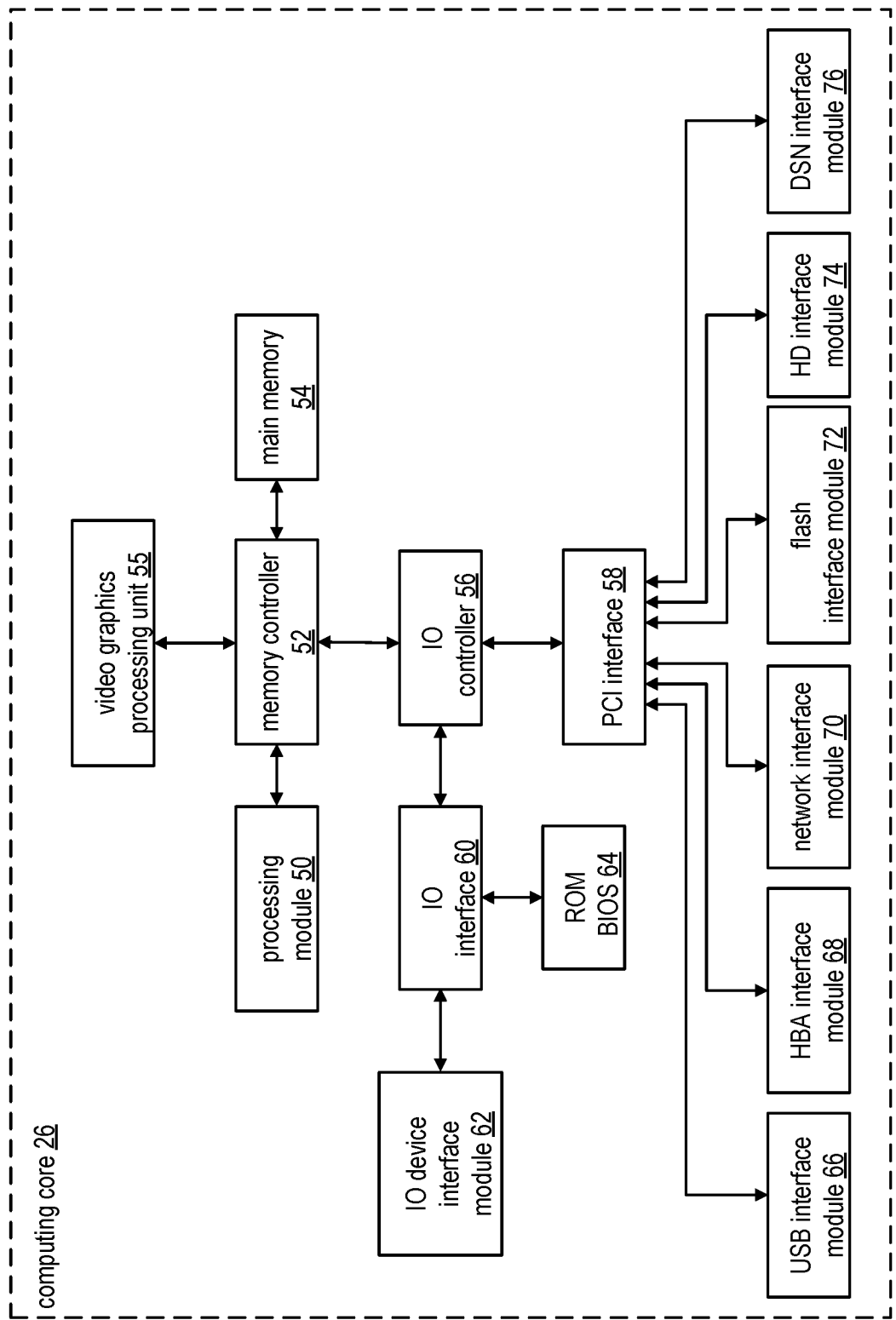
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing/user devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9C. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
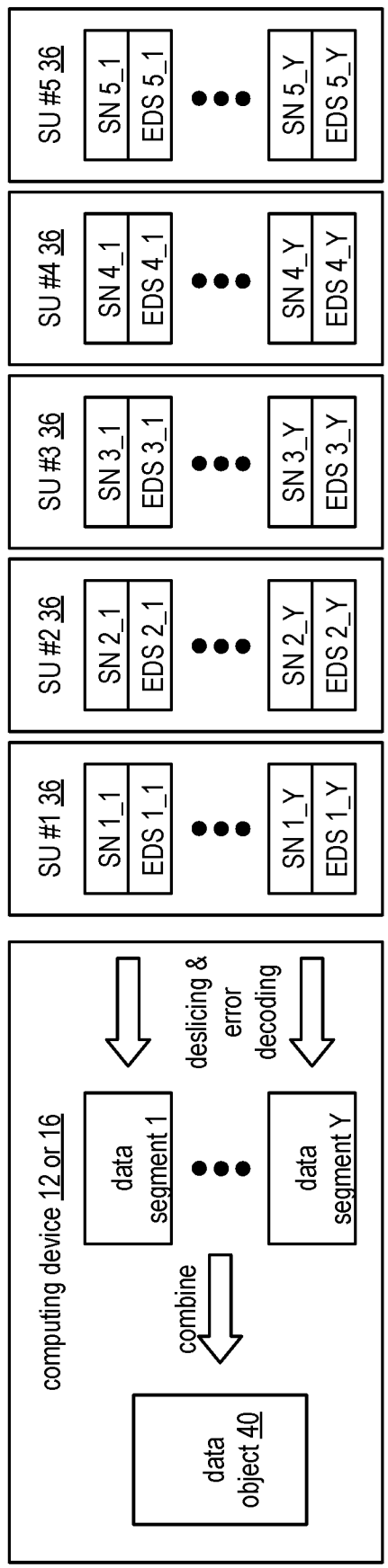
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
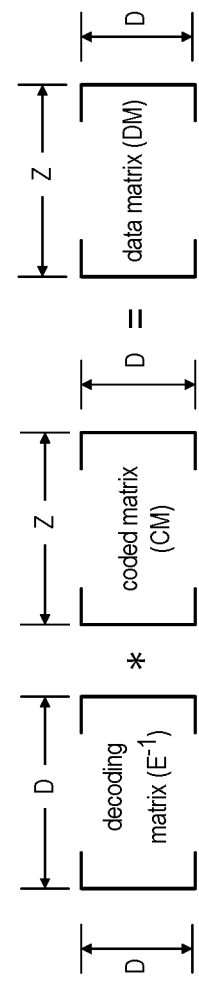
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In an object storage system, such as a DSN memory, latency for high-bandwidth and real-time content/data is high. Latency is high because an access layer in the storage system has to rebuild sources from slices of data and send the data to the requesting clients over public wide area networks (WANs) depending on the location of the client and the rest points of the content or data. It is not ideal to deliver high bandwidth, low-latency data for real-time applications such as video playback or to retrieve large image files for rendering in a browser. To overcome this issue, object storage systems support a CDN (content delivery network) that caches needed content at edge locations close to clients in order to deliver the content or data quickly. The edge nodes are expected to cache content for the duration of time-to-live (TTL) set by the access layer of an object storage system. The edge nodes of a CDN network are expected to manage these cached objects and are usually overlaid on top of the object storage system. However, this configuration makes it more expensive to manage and operate for cloud providers.

Figure 9A:
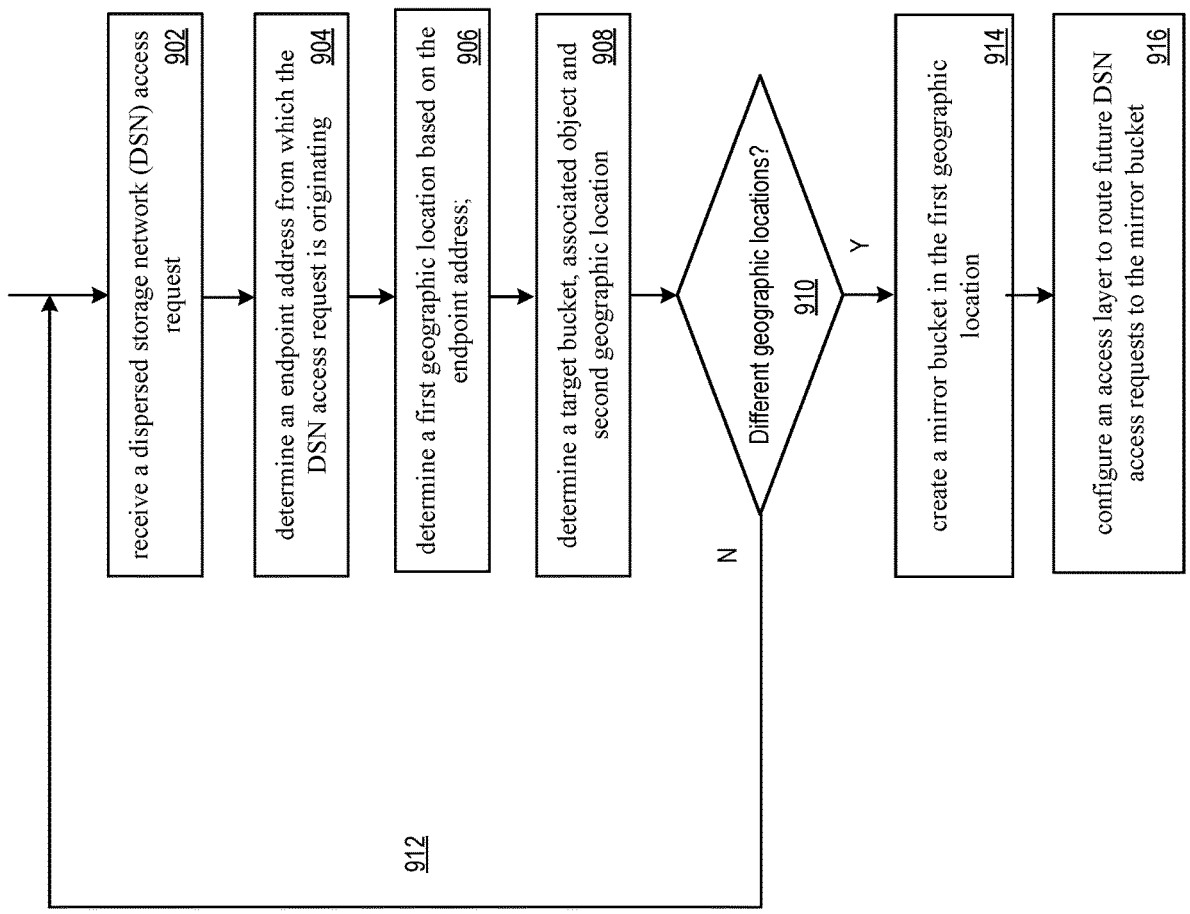
FIG. 9A is a flowchart illustrating an example of using mirrors for content distribution networks (CDN) in accordance with the present invention.

FIG. 9A is a flowchart illustrating an example of using mirrors for content distribution networks (CDN). In particular, a method is presented for use in conjunction with one or more functions and features described in conjunction with FIGS. 1-9C. The method is for execution by one or more processing modules of a dispersed storage network (DSN). The one or more processing modules can, in one embodiment, include a DS processing unit.

The method begins, in step 902, by receiving a dispersed storage network (DSN) access request. The dispersed storage network (DSN) access request can originate with, for example, any of the computing/user devices (12, 14 or 16) in FIG. 1.

The method continues, in step 904, by determining an endpoint address from which the DSN access request is originating. The endpoint address can include, for example, a Uniform Resource Locator (URL) or other IP address.

The method continues, in step 906, by determining a first geographic location based on the endpoint address. The first geographic location, in one embodiment, is a region based on the endpoint address. Originating location can be determined through any of: client IP address, region, storage account, user ID or key, transaction ID prefixes or custom headers.

The method continues, in step 908, by determining a target bucket and object the DSN access request is associated with. A bucket is considered a unit of storage. A hash file stores data in bucket format. A hash function, h, is a mapping function that maps all the set of search-keys K to an address where actual records are placed. It is a function from search keys to bucket addresses. The determining a bucket and object the DSN access request is associated with includes determining resources from the endpoint address. Bucket or object metadata can identify any of: content is cacheable at remote nodes, region for which caching is allowed, IP ranges, storage account, user ID or key, transaction ID prefixes, other custom headers, default TTL (static or dynamic), or associated cache bucket that is a 2-way mirror. The method continues, in step 908, by determining a second geographic location of the target bucket.

The method continues, in step 910, by determining if the first and second geographic locations are the same. If so, the processing returns (912) to step 902 to receive additional requests.

The method continues, in step 914, for differing first and second geographic locations, by creating a mirror bucket (cache bucket) in the first geographic location. For example, the mirror bucket is a geographically local (to the origination) mirror bucket. The cache buckets can use 1-way mirroring (for reads) or 2-way mirroring (for read and write) principles available to support mirror buckets at the object level in order to maintain these cache buckets based on TTL (i.e., eventually consistent mirrors based on cache TTL time-PUSH model). For a write, the cache bucket can store the objects locally and write to main bucket when TTL expires. Similarly for a read, the cache bucket can return objects locally and get updates pushed from the main bucket when TTL expires for the main bucket.

The method continues, in step 916, by configuring an access layer to route future DSN access requests to the mirror bucket. The configuring an access layer to route future DSN access requests to the mirror bucket includes networking redirects, including any of: SDN (software defined networking) redirects or HTTP (HyperText Transfer Protocol) redirects. HTTP is the underlying protocol used by the World Wide Web and defines how messages are formatted and transmitted, and what actions Web servers and browsers should take in response to various commands. A redirect is a way to send both users and search engines to a different URL from one they originally requested.

The DS processing unit, in one embodiment, determines a minimum time period (how soon) to mirror object writes based on time-to-live (TTL) needs. For example, a minimum time period to mirror object writes is based on cache time-to-live (TTL) needs as determined by the access layer.

The mirror bucket then acts as a cache bucket to serve requests locally and thereby optimize performance, while having up-to-date content. This configuration also eliminates the need to have an overlay CDN network with edge nodes to manage cached objects and serve requests locally, thereby reducing cost and complexity. CDN use cases are thus supported with no overlay network and additional edge nodes, data I/O traffic and load are optimized, bandwidth between edge nodes and server/access layer is optimized, cache refresh load on the access layer is optimized. In addition, the technology described herein leverages existing 2-way mirror capability with minimal modifications to support additional CDN use cases.

Figure 9B:
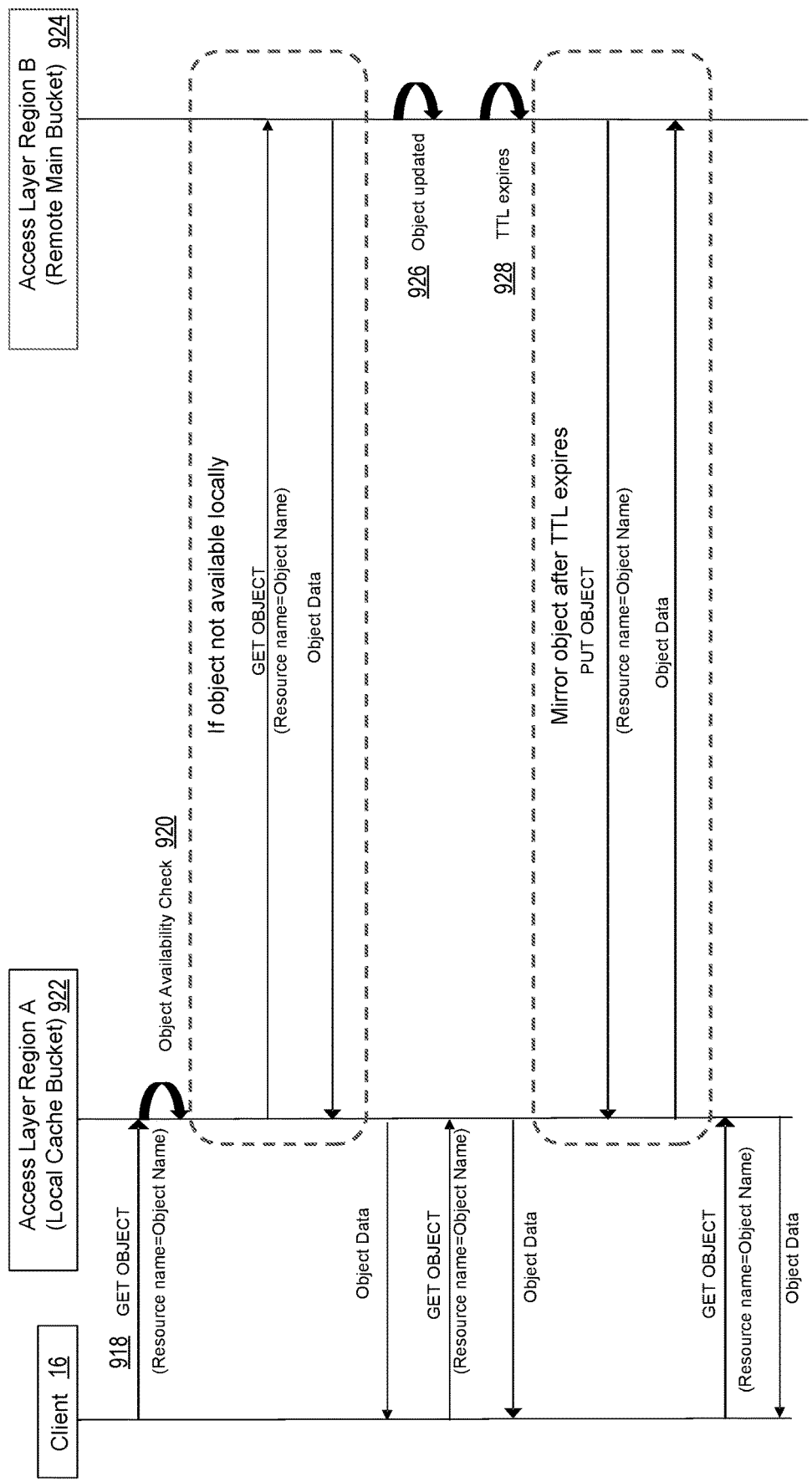
FIG. 9B is a diagram illustrating an example embodiment of a using mirrors for content distribution networks (CDN) in accordance with the present invention.

FIG. 9B is a schematic block diagram of a using local mirrors for content distribution networks (CDN) of a DS processing unit for an access layer upon receiving a request for an object. For content distribution, a CDN with a set of edge nodes are deployed in cloud systems to improve latency and performance for content CDN requires that content be available at the serving edge nodes closest to the clients making request for content, and the content is usually cached The content at edge nodes in a CDN are cached for a period of time or until the content changes. The content cached is provided to the clients making the requests locally.

In an object storage system, such as a DSN memory, an access layer can determine the geographic location or region of the bucket from which content is being retrieved, and compare that to the geographic location or region of the originating request, to determine if a mirrored bucket should be created in another geographic location or region, in order to have up-to-date content available locally at the requesting geographic location or region to serve requests. The access layer can automatically create a mirror bucket that is eventually consistent, in another geographic location or region, with no user intervention, while serving requests using the local mirror bucket to improve latency and optimize performance for content delivery. This can be achieved without an overlay of edge nodes and a CDN network on top of a DSN memory based object storage system.

As shown in FIG. 9B, a request (read) 918 for object data (GET OBJECT) will result in a first availability check 920 of a local cache bucket 922 (access layer geographic region A). If the object is not available in the local cache bucket, the request will get passed to a remote location main bucket 924 (access layer geographic region B) and returned to the local cache bucket and the requesting client. The local cache bucket can then return objects requested locally. In addition, updates get pushed 926 from the main bucket when TTL expires 928 for the main bucket. The updates are then locally available in the local cache bucket for future requests.

Figure 9C:
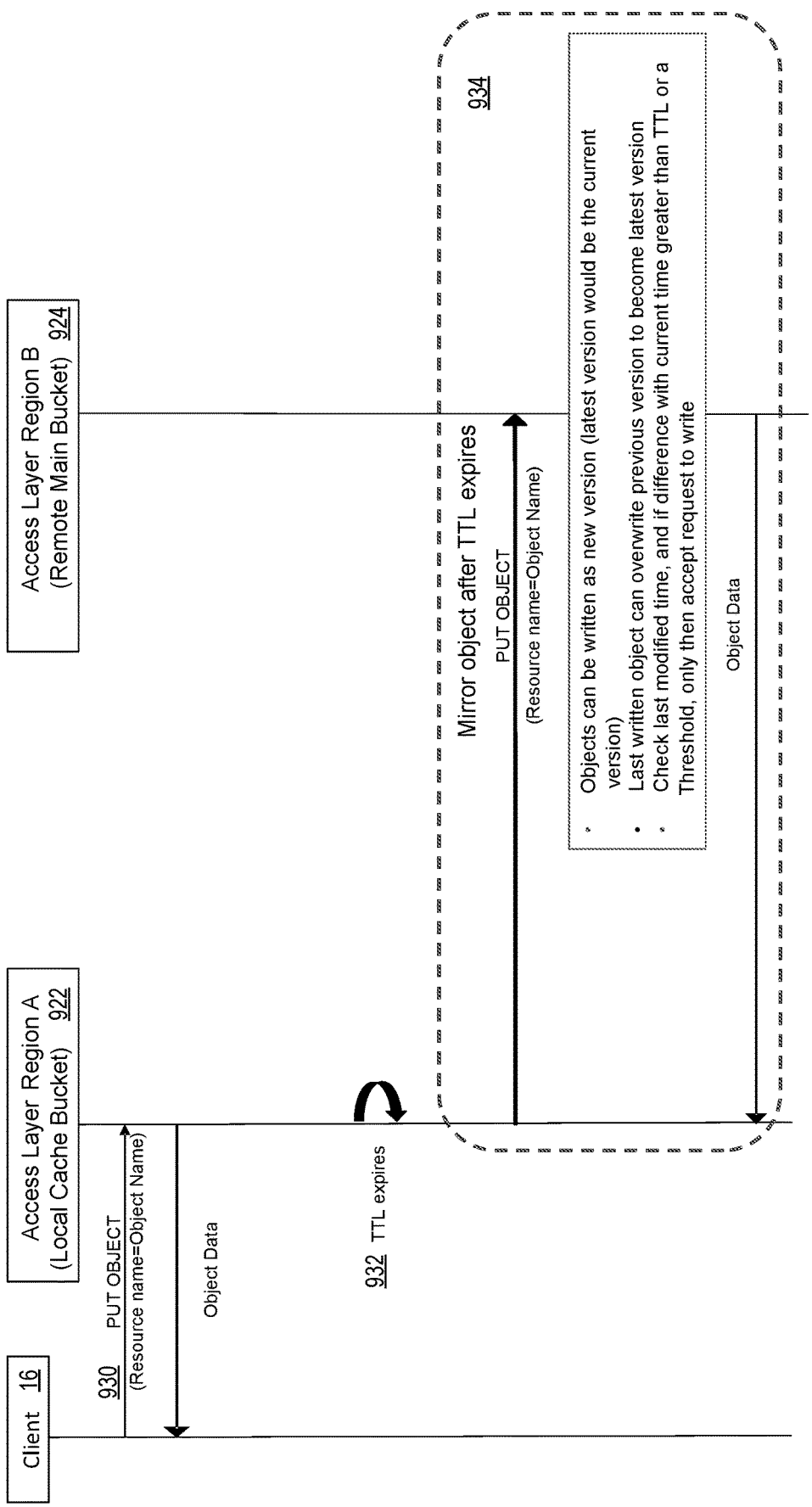
FIG. 9C is another diagram illustrating an example embodiment of a using mirrors for content distribution networks (CDN) in accordance with the present invention.

FIG. 9C is a flowchart illustrating an example of using mirrors for content distribution networks (CDN). As shown, a request to store object data (write) 930 (PUT OBJECT) will result in storage in local cache bucket 922 (access layer geographic region A). The local cache bucket can store the object data locally and can return object data requested. When TTL expires 932, the object data is written 934 to remote main bucket 924. In addition, updates get pushed from the local bucket, when TTL expires 932, to the remote main bucket 924. Objects can be written as a new version (latest version would be the current version). The last written object can overwrite a previous version to become the latest version. The DS processing unit can check for last time modified, and if different than current time, greater than TTL or greater than a threshold, accept the request to write.

The method described above in conjunction with the processing module or DS processing unit can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   receiving a dispersed storage network (DSN) access request;
   determining an endpoint address from which the DSN access request is originating;
   determining a first geographic location based on the endpoint address;
   determining a target bucket and object the DSN access request is associated with;
   determining a second geographic location of the target bucket;
   for differing first and second geographic locations, creating a mirror bucket in the first geographic location;
   configuring an access layer to route future DSN access requests to the mirror bucket;
   in response to the access request being a write request, storing the object in the mirror bucket; and
   writing the object to the target bucket in response to a time-to-live of the mirror bucket expiring.

2. The method of claim 1 further comprises determining a minimum time period to mirror object writes based on cache time-to-live (TTL) needs as determined by the access layer.

3. The method of claim 1, wherein the endpoint address includes a URL or IP address.

4. The method of claim 1, wherein the first geographic location is a region based on the endpoint address.

5. The method of claim 1, wherein the determining the bucket and object the DSN access request is associated with includes determining resources from the endpoint address.

6. The method of claim 1, wherein the mirror bucket is a geographically local mirror bucket.

7. The method of claim 1, wherein the configuring an access layer to route future DSN access requests to the mirror bucket includes networking redirects.

8. The method of claim 1, wherein the networking redirects include SDN redirects.

9. The method of claim 1 further comprises:
   in response to the access request being a read request, returning the object from the mirror bucket to a requester of the access request; and
   updating the mirror bucket from the target bucket in response to a time-to-live of the target bucket expiring, wherein the mirror bucket is a two-way mirror bucket, and the configuring an access layer to route future DSN access requests to the mirror bucket comprises network redirects.

10. A computing device of a group of computing devices of a dispersed storage network (DSN), the computing device comprises:
    an interface;
    a local memory; and
    a processing module operably coupled to the interface and the local memory, wherein the processing module is configured to:

receive a dispersed storage network (DSN) access request;
determine an endpoint address from which the DSN access request is originating;
determine a first geographic location based on the endpoint address;
determine a target bucket and object the DSN access request is associated with;
determine a second geographic location of the target bucket;
for differing first and second geographic locations, create a mirror bucket in the first geographic location;
configure an access layer to route future DSN access requests to the mirror bucket;
in response to the access request being a read request, return the object from the mirror bucket to a requester of the access request; and
update the mirror bucket from the target bucket in response to a time-to-live of the target bucket expiring.

11. The computing device of claim 10 further comprises determining a minimum time period to mirror object writes based on time-to-live (TTL) needs.

12. The computing device of claim 10 further comprises determining how soon to mirror object writes based on cache time-to-live (TTL) needs as determined by the access layer.

13. The computing device of claim 10, wherein the endpoint address includes a URL or IP address.

14. The computing device of claim 10, wherein the first geographic location is a region based on the endpoint address.

15. The computing device of claim 10, wherein the determining the bucket and object the DSN access request is associated with includes determining resources from the endpoint address.

16. The computing device of claim 10, wherein the mirror bucket is a geographically local mirror bucket.

17. The computing device of claim 10, wherein the configuring an access layer to route future DSN access requests to the mirror bucket includes networking redirects including any of: SDN redirects or HTTP redirects.

18. A dispersed storage network (DSN) comprises:
a plurality of dispersed storage units:
a processing module operably coupled to the plurality of dispersed storage units, wherein the processing module is configured to:
receive a dispersed storage network (DSN) access request;
determine an endpoint address from which the DSN access request is originating;
determine a first geographic location based on the endpoint address;
determine a target bucket and object the DSN access request is associated with;
determine a second geographic location of the target bucket;
for differing first and second geographic locations, create a mirror bucket in the first geographic location;
configure an access layer to route future DSN access requests to the mirror bucket;
in response to the access request being a read request, return the object from the mirror bucket to a requester of the access request; and
update the mirror bucket from the target bucket in response to a time-to-live of the target bucket expiring.

19. The DSN of claim 18 further comprises determining a minimum time period to mirror object writes based on cache time-to-live (TTL) needs as determined by the access layer.

20. The DSN of claim 18, wherein the determining the bucket and object the DSN access request is associated with includes determining resources from the endpoint address.

* * * * *